(12) United States Patent
Spencer et al.

(10) Patent No.: US 11,052,617 B2
(45) Date of Patent: Jul. 6, 2021

(54) FABRICATION OF PLANK STRINGERS

(71) Applicant: The Boeing Company, Chicago, IL (US)

(72) Inventors: Scott M. Spencer, Everett, WA (US); Jessica R. Hughes, Seattle, WA (US); Jae Dong Hwang, Bellvue, WA (US); Joseph L. Sweetin, Edmonds, WA (US); Kanna M. Pham, Renton, WA (US); Jaime C. Garcia, Kent, WA (US); Gregory P. Freed, Gig Harbor, WA (US); Frederick T. Calkins, Renton, WA (US); Cynthia G. Feng, Seattle, WA (US); Jiangtian Cheng, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 16/178,354

(22) Filed: Nov. 1, 2018

(65) Prior Publication Data

US 2020/0139646 A1 May 7, 2020

(51) Int. Cl.
*B29C 70/38* (2006.01)
*B29C 70/54* (2006.01)
*B29K 307/04* (2006.01)

(52) U.S. Cl.
CPC ............ *B29C 70/386* (2013.01); *B29C 70/54* (2013.01); *B29C 70/545* (2013.01); *B29K 2307/04* (2013.01)

(58) Field of Classification Search
CPC ... B29C 70/228; B29C 70/54; B29D 99/0003; Y10T 156/1057
See application file for complete search history.

(56) References Cited

U.S. PATENT DOCUMENTS

| | | | |
|---|---|---|---|
| 7,897,004 B2 | 3/2011 | Engwall et al. | |
| 8,540,921 B2 | 9/2013 | Senibi et al. | |
| 8,714,485 B2 | 5/2014 | Matheson et al. | |
| 8,763,253 B2 | 7/2014 | Kamaraj et al. | |
| 9,242,393 B2 | 1/2016 | Bland | |
| 2012/0052247 A1 | 3/2012 | Pook et al. | |

(Continued)

OTHER PUBLICATIONS

U.S. Appl. No. 15/907,224, Solid Laminate Stringer, filed Feb. 27, 2018.

*Primary Examiner* — Mark A Osele
*Assistant Examiner* — Christopher C Caillouet
(74) *Attorney, Agent, or Firm* — McDonnell Boehnen Hulbert & Berghoff LLP

(57) ABSTRACT

A method of fabricating a plank stringer for use in an aircraft includes grouping a plurality of stacked plies of reinforcing material into a plurality of charges, where each charge in the plurality of charges includes a substack of plies. The method also includes grouping the plurality of charges into two or more groups such that, for each charge in a given group, a respective substack of plies includes a sequence of orientation angles with respect to a longitudinal axis of the plank stringer corresponding to the given group. The method also includes laying up each group of charges as a continuous blanket of plies, where each continuous blanket of plies includes the respective substack of plies for each charge in the respective group. The method also includes cutting each continuous blanket of plies into the respective group of charges and stacking the plurality of charges to form the plank stringer.

20 Claims, 8 Drawing Sheets

(56) References Cited

U.S. PATENT DOCUMENTS

2012/0292446 A1 11/2012 Kamaraj et al.
2014/0248462 A1 9/2014 Kamaraj et al.
2016/0207607 A1 7/2016 Charles et al.

| PLY | CHARGE | GROUP | ORIENTATION ANGLE |
|---|---|---|---|
| PLY1 | CHARGE1 | GROUP1 | 45 |
| PLY2 | CHARGE1 | GROUP1 | 90 |
| PLY3 | CHARGE1 | GROUP1 | -45 |
| PLY4 | CHARGE1 | GROUP1 | 0 |
| PLY5 | CHARGE1 | GROUP1 | 0 |
| PLY6 | CHARGE1 | GROUP1 | 45 |
| PLY7 | CHARGE1 | GROUP1 | 0 |
| PLY8 | CHARGE2 | GROUP4 | 0 |
| PLY9 | CHARGE2 | GROUP4 | -45 |
| PLY10 | CHARGE2 | GROUP4 | 0 |
| PLY11 | CHARGE2 | GROUP4 | 0 |
| PLY12 | CHARGE2 | GROUP4 | 45 |
| PLY13 | CHARGE2 | GROUP4 | 90 |
| PLY14 | CHARGE2 | GROUP4 | -45 |
| PLY15 | CHARGE2 | GROUP4 | 0 |
| PLY16 | CHARGE3 | GROUP1 | 0 |
| PLY17 | CHARGE3 | GROUP1 | 45 |
| PLY18 | CHARGE3 | GROUP1 | 90 |
| PLY19 | CHARGE3 | GROUP1 | -45 |
| PLY20 | CHARGE3 | GROUP1 | 0 |
| PLY21 | CHARGE3 | GROUP1 | 0 |
| PLY22 | CHARGE3 | GROUP1 | 45 |
| PLY23 | CHARGE3 | GROUP1 | 0 |
| PLY24 | CHARGE4 | GROUP3 | 0 |
| PLY25 | CHARGE4 | GROUP3 | -45 |
| PLY26 | CHARGE4 | GROUP3 | 90 |
| PLY27 | CHARGE4 | GROUP3 | 45 |
| PLY28 | CHARGE4 | GROUP3 | 0 |
| PLY29 | CHARGE4 | GROUP3 | 0 |
| PLY30 | CHARGE4 | GROUP3 | -45 |
| PLY31 | CHARGE4 | GROUP3 | 0 |

FIG. 7

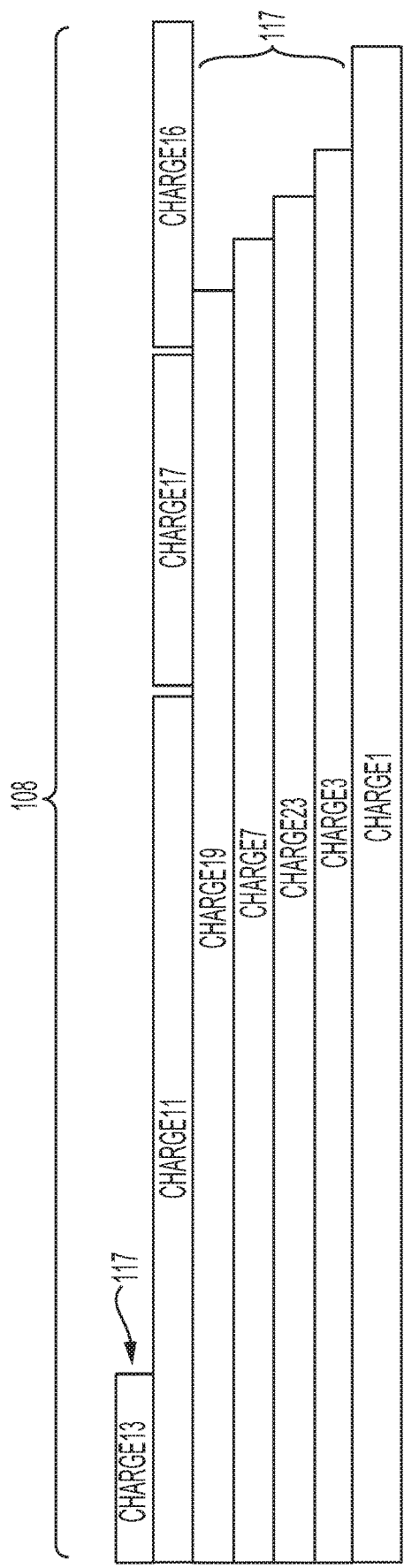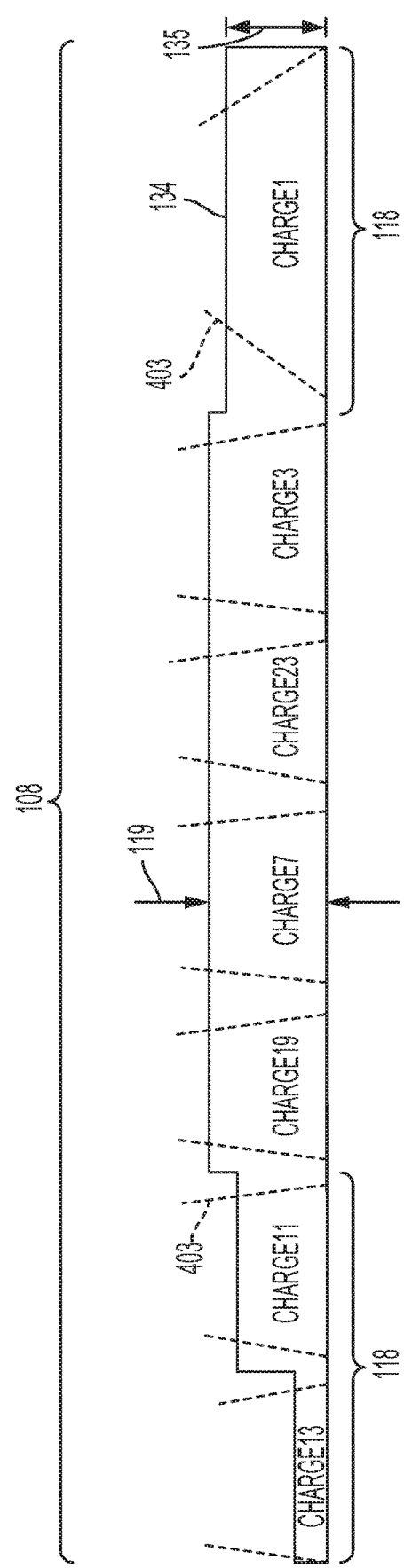

FABRICATION OF PLANK STRINGERS

FIELD

The present disclosure generally relates to fabrication systems and methods of fabricating a plank stringer for use in an aircraft.

BACKGROUND

Current methods of fabrication for plank stringers for use in an aircraft involve laying up plies of reinforcing material into a series of similarly-shaped, trapezoidal charges, and then stacking the charges to assemble the overall plank stringer profile. However, some plank stringers may be designed with profile variations in both the vertical and longitudinal directions of the plank stringer, which may make subdividing the plank stringer into similarly-shaped charges difficult. For instance, the side walls of a plank stringer may include a variable angle of incline. As another example, the height of the plank stringer may vary in the longitudinal direction due to the discontinuation of some plies within the plank stringer's profile. Because of these variations, there may be more differentiation in the individual charges that will make up the plank stringer. This may both increase the number of charges and the number of layup and stacking operations to fabricate the plank stringer.

There is a need for improved systems and methods for fabricating plank stringers that have a variable profile.

SUMMARY

A fabrication system for a plank stringer for use in an aircraft is described, wherein the plank stringer comprises a longitudinal axis and a plurality of stacked plies of reinforcing material, and wherein each ply of reinforcing material in the plurality of stacked plies of reinforcing material is arranged at an orientation angle with respect to the longitudinal axis. The fabrication system includes an automated tape-laying machine (ATLM), an automated cutting tool, and a computing device. The computing device includes one or more processors, and a non-transitory, computer readable medium having stored thereon instructions, that when executed by the one or more processors, cause the computing device to perform certain functions. The functions include grouping the plurality of stacked plies of reinforcing material into a plurality of charges, where each charge in the plurality of charges comprises a sub stack of plies. The functions also include grouping the plurality of charges into two or more groups such that, for each charge in a given group, a respective substack of plies comprises a sequence of orientation angles corresponding to the given group. The functions also include laying up, via the ATLM, each group of charges as a continuous blanket of plies, where each continuous blanket of plies includes the respective substack of plies for each charge in the respective group. The functions also include cutting, via the automated cutting tool, each continuous blanket of plies into the respective group of charges and stacking the plurality of charges to form the plank stringer.

In another example, a method of fabricating a plank stringer for use in an aircraft is described, where the plank stringer includes a longitudinal axis and a plurality of stacked plies of reinforcing material, and where each ply of reinforcing material in the plurality of stacked plies of reinforcing material is arranged at an orientation angle with respect to the longitudinal axis. The method includes grouping, via a computing device, the plurality of stacked plies of reinforcing material into a plurality of charges, where each charge in the plurality of charges includes a substack of plies. The method also includes grouping, via the computing device, the plurality of charges into two or more groups such that, for each charge in a given group, a respective substack of plies comprises a sequence of orientation angles corresponding to the given group. The method also includes laying up each group of charges as a continuous blanket of plies, where each continuous blanket of plies includes the respective substack of plies for each charge in the respective group. The method also includes cutting each continuous blanket of plies into the respective group of charges and stacking the plurality of charges to form the plank stringer.

In another example, a non-transitory computer readable medium is described. The non-transitory computer readable medium has instructions stored thereon, that when executed by a computing device, cause the computing device to perform functions for fabricating a plank stringer for use in an aircraft, where the plank stringer includes a longitudinal axis and a plurality of stacked plies of reinforcing material, and where each ply of reinforcing material in the plurality of stacked plies of reinforcing material is arranged at an orientation angle with respect to the longitudinal axis. The functions include grouping the plurality of stacked plies of reinforcing material into a plurality of charges, where each charge in the plurality of charges comprises a substack of plies. The functions also include grouping the plurality of charges into two or more groups such that, for each charge in a given group, a respective substack of plies comprises a sequence of orientation angles corresponding to the given group. The functions also include laying up, via the ATLM, each group of charges as a continuous blanket of plies, where each continuous blanket of plies includes the respective substack of plies for each charge in the respective group. The functions also include cutting, via the automated cutting tool, each continuous blanket of plies into the respective group of charges and stacking the plurality of charges to form the plank stringer.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures. The Figures are not to scale.

FIG. 7 illustrates a grouping of a plurality of plies of a plank stringer into a plurality of charges, and a grouping of the plurality of charges into a plurality of groups, according to an example implementation.

FIG. 9 illustrates a plan view of a group of charges laid up as a continuous blanket of plies, according to an example implementation.

FIG. 10 illustrates a cross-sectional view of a group of charges laid up as a continuous blanket of plies, according to an example implementation.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include fabrication systems and methods of fabrication for a plank stringer for use in an aircraft. Based on a proposed design for a plank stringer, a fabrication system may group the plurality of plies of reinforcing material of the plank stringer into a plurality of charges, and then grouping the plurality of charges into a plurality of groups. The grouping of the plies and charges may be based on, for example, the orientations of the individual plies within each charge, the angle of incline of the side walls of the plank stringer, and the location of discontinued plies along the longitudinal length of the plank stringer, among other possibilities. Once grouped, the fabrication system lays up each group of charges into a continuous blanket of plies, and then cuts the continuous blanket into the respective charges. The charges are then stacked to form the plank stringer.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
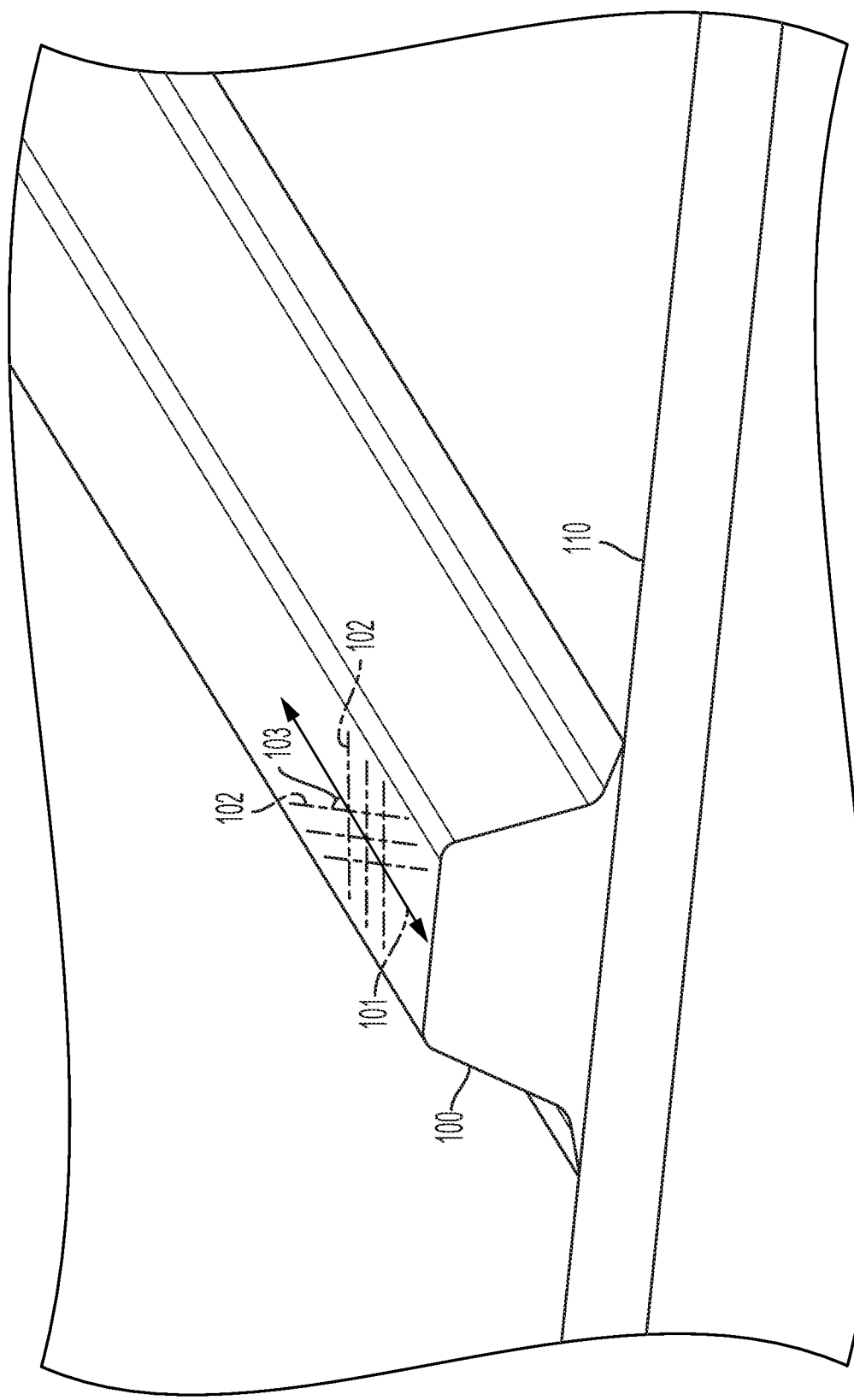
FIG. 1 illustrates a perspective view of a plank stringer, according to an example implementation.

Referring now to FIG. 1, a perspective view of a plank stringer 100 is shown, according to an example implementation. For instance, the plank stringer 100 may be used as a reinforcing member on the interior laminate skin 110 of an aircraft component, such as a hull or wing. The plank stringer 100 may be generally trapezoidal in shape, and includes a longitudinal axis 101. Further, the plank stringer 100 is formed from a plurality of stacked plies 102 of reinforcing material, such as a carbon fiber reinforced polymer. Each ply 102 of reinforcing material in the plurality of stacked plies 102 of reinforcing material is arranged at an orientation angle 103 with respect to the longitudinal axis 101. For example, the top two plies 102 are shown on the top of the plank stringer 100 shown in FIG. 1, arranged at an orientation angle 103 of 45 degrees and −45 degrees, respectively, with respect to the longitudinal axis 101. In the examples discussed herein, angles of 0, 45, −45, and 90 degrees are contemplated for the plurality of plies 102 in the plank stringer 100. However, other orientation angles 103 such as 30, −30, 60, and −60 degrees are also possible.

The plurality of stacked plies 102 of reinforcing material may be divided into a plurality of charges 104. This can be seen in FIG. 2, which shows a cross-sectional view of the plank stringer 100. Accordingly, each charge 104 in the plurality of charges 104 includes a substack 105 of plies 102, as shown in FIG. 3. As discussed further below, the number of plies 102 in each substack 105 of plies 102 may differ from one charge 104 to the next.

The number and orientation of the stacked plies 102 of reinforcing material, as well as the geometric profile of the plank stringer 100, may be based on design considerations such as expected loading conditions, operating environments (e.g., temperature changes), integration with the overall aircraft design, among other factors. For instance, a plank stringer 100 that is subject to greater loading may be designed to include more stacked plies 102 of reinforcing material, and may have a larger geometric profile. A plank stringer 100 that is subject to lesser loading may be designed with fewer stacked plies 102, and so on. For these reasons, as well as other possible reasons, the plank stringer 100 may have a geometric profile that varies along its length.

Figure 2:
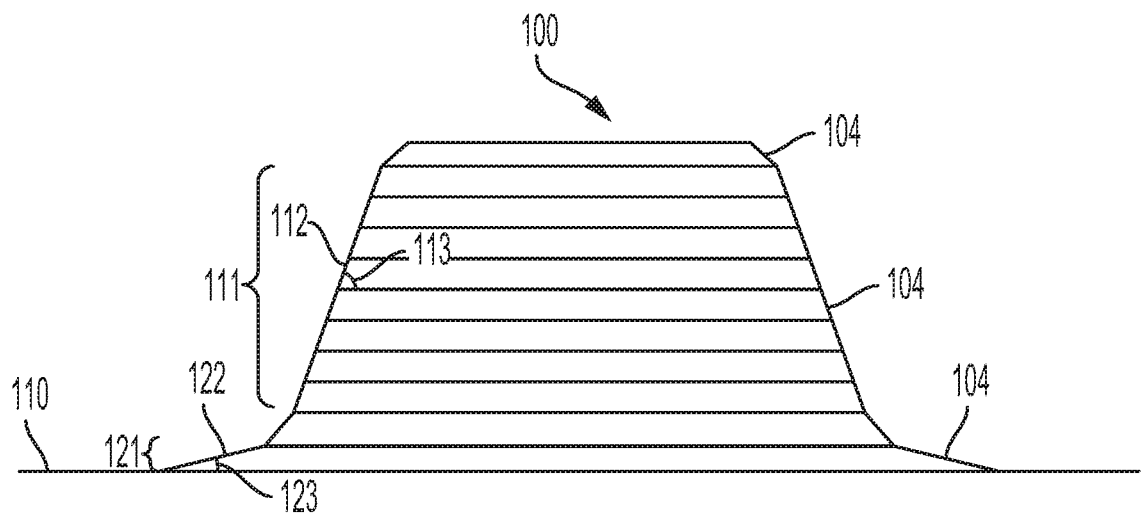
FIG. 2 illustrates a cross-sectional view of a plurality of charges of a plank stringer, according to an example implementation.
Figure 3:
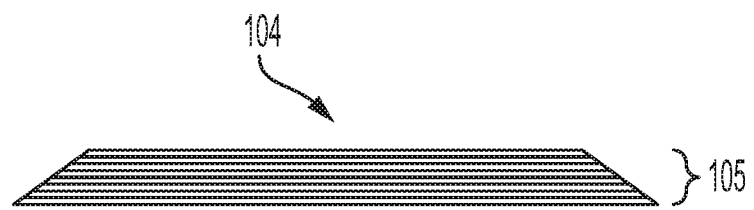
FIG. 3 illustrates a substack of plies in a charge of a plank stringer, according to an example implementation.

For instance, in some implementations as otherwise discussed herein, and as shown in the example of FIG. 2, the plank stringer 100 may include a first section 111 having first side walls 112 at a first angle of incline 113 with respect to the skin 110. For instance, the first angle of incline 113 may be within a range of about 60 to 75 degrees. Further, the plank stringer 100 may include a second section 121, shown as the bottommost portion of the plank stringer 100 in FIG. 2, having second side walls 122 at a second angle of incline 123. For example, the second angle of incline 123 with respect to the skin 110 is not as steep as the first angle of incline 113, and may be within a range of about 10 to 20 degrees. As a result, a wider base for the plank stringer 100 may help to reduce the chances of delamination of the plank stringer 100 from the skin 110. The plank stringer 100 may include additional sections with differently angled side walls, such as a transition sections between the first section 111 and the second section 121, and between the first section 111 and the top of the plank stringer 100. Other arrangements are also possible.

Figure 4:
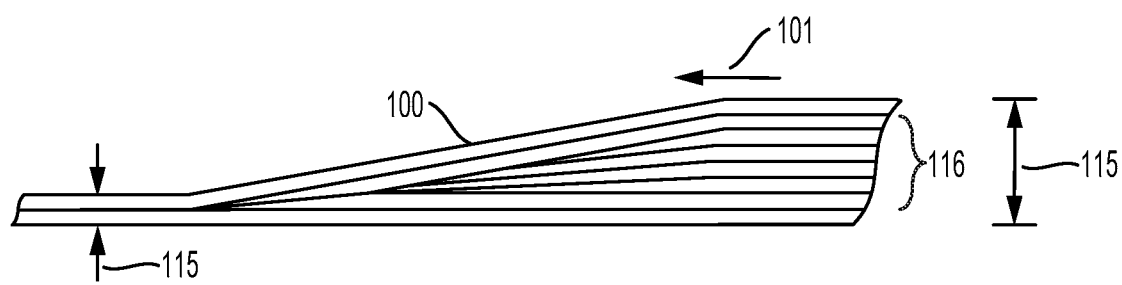
FIG. 4 illustrates a cross-sectional side view of a plank stringer including a plurality of discontinued plies, according to an example implementation.

FIG. 4 shows a cross-sectional side view of the plank stringer 100, and illustrates another example of the geometric variations that can occur along the profile of a given plank stringer 100. In particular, a height 115 of the plank stringer 100 may vary based on one or more discontinued plies 116 within the plurality of stacked plies 102 of reinforcing material. For example, this may allow the height 115 of the plank stringer 100 to be greater in areas of the aircraft with larger expected loads, and reduced in areas with lower expected loads. This may result in a more efficient use of material and a faster fabrication time, among other possible benefits. As shown in FIG. 4, as the plank stringer 100 approaches its longitudinal end (from right to left), it tapers to a reduced height 115 as plies 102 from the middle of the plank stringer 100 are progressively discontinued.

Figure 5:
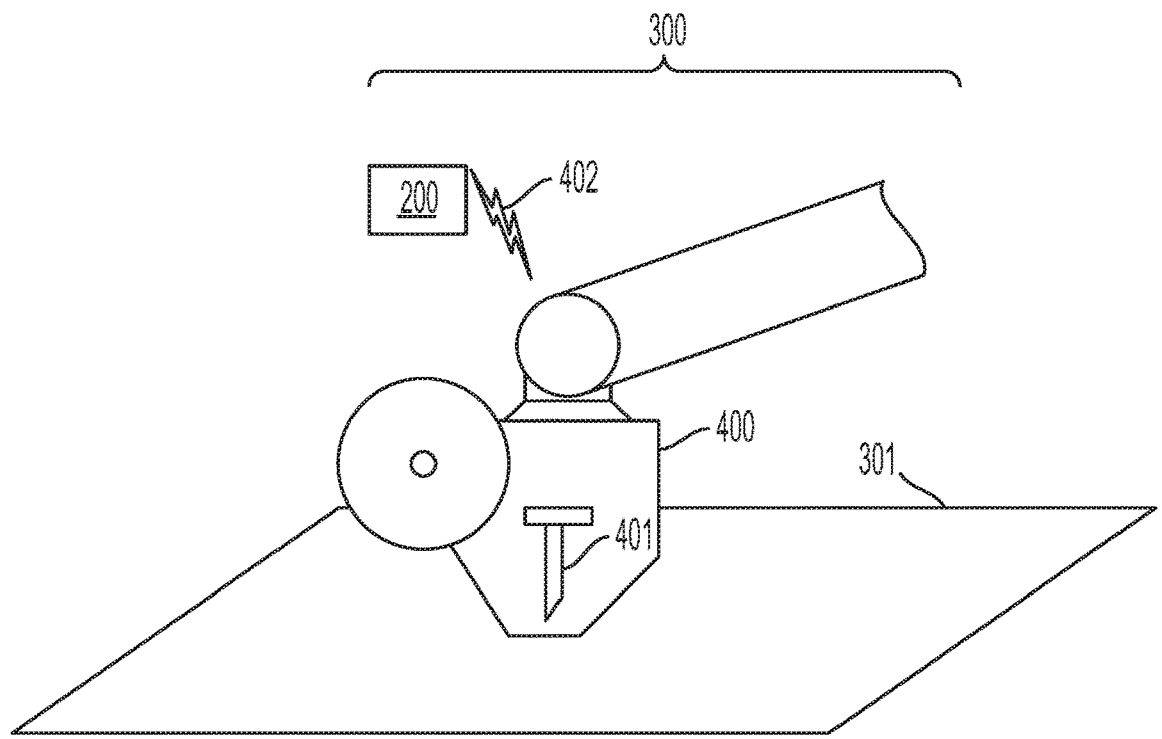
FIG. 5 illustrates a perspective view of a fabrication system for a plank stringer, according to an example implementation.
Figure 6:
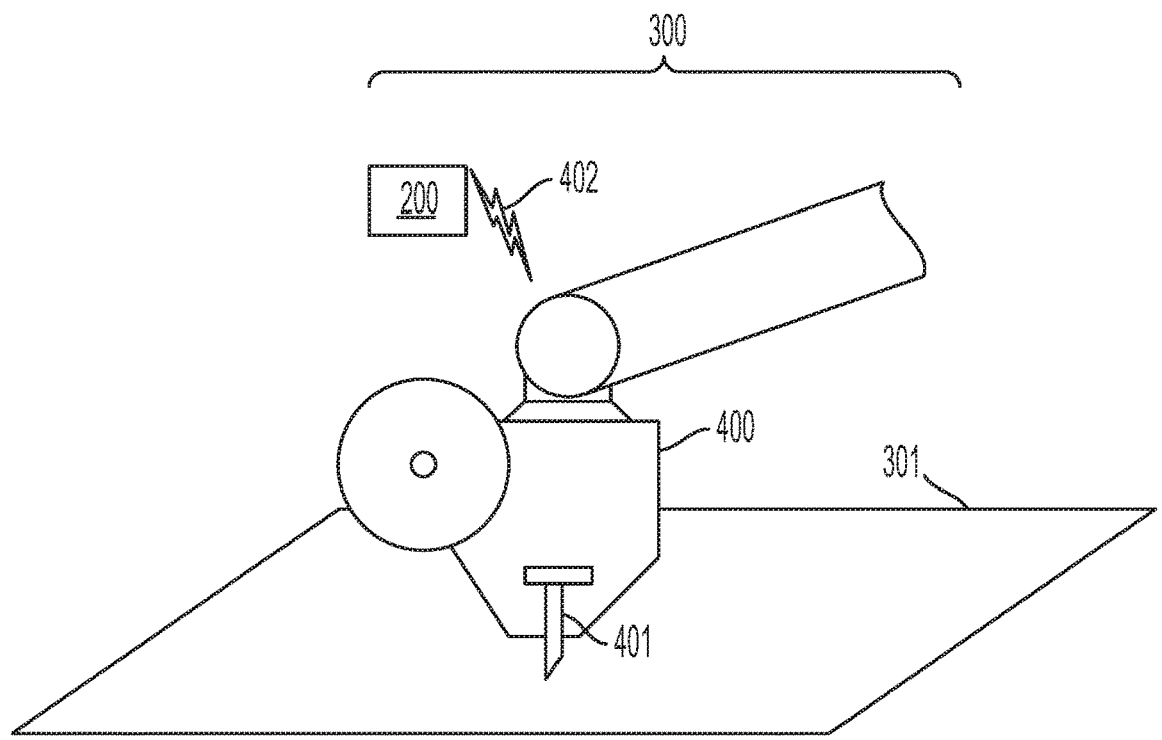
FIG. 6 illustrates another perspective view of a fabrication system for a plank stringer, according to an example implementation.

FIG. 5 shows a fabrication system 300 for fabricating the plank stringer 100, such as the plank stringer 100 shown in FIGS. 1-4. The fabrication system 300 includes an automated tape laying machine (ATLM) 400, which lays up each ply 102 of reinforcing material according to the designed orientation angle 103 with respect to the longitudinal axis 101. The plies 102 may be laid up on a surface 301, which may be a component of the ATLM 400. The fabrication system 300 further includes a cutting tool 401 for trimming the laid plies 102 into the particular geometry required of a given charge 104. The cutting tool 401 may be an ultrasonic knife, or a laser, among other possibilities. In some implementations, the cutting tool 401 may be integrated with the ATLM 400, as shown in FIG. 5. For example, the cutting tool 401 may be in a retracted position during layup of the plies 102 of reinforcing material. During a trimming operation, as shown in FIG. 6, the cutting tool 401 may be extended. In other implementations, the cutting tool 401 may be separate from the ATLM 400. For instance, the cutting tool 401 may be articulated separately from the ATLM 400. Other configurations are also possible.

The fabrication system 300 further includes a computing device 200, which may communicate with the ATLM 400 via a wireless connection 402, as shown in FIGS. 5 and 6. Additionally or alternatively, the computing device may communicate with the ATLM 400 via a wired connection. The computing device 200 determines the groupings of the plies 102 and the charges 104 in the fabrication process for a given a given plank stringer 100 based on its design characteristics. By way of illustration, a design for a plank stringer 100 will be discussed hereafter that includes two hundred stacked plies 102 of reinforcing material in an arrangement of orientation angles 103 including 0, 45, −45, and 90 degrees.

FIG. 7 shows a grouping of plies and charges according to one possible fabrication solution for the example plank stringer 100. As shown in FIG. 7, the computing device 200 groups the plurality of stacked plies 102 of reinforcing material into a plurality of charges 104, wherein each charge 104 in the plurality of charges 104 includes a substack 105 of plies 102. As noted above, each substack 105 might not have the same number of plies 102. For example, the substack 105 of plies 102 in the first charge 104 ("Charge1") includes seven plies 102, whereas the substack 105 of plies 102 in the second charge 104 ("Charge2") includes eight plies 102.

Further, the computing device 200 groups the plurality of charges 104 into two or more groups 106 such that, for each charge 104 in a given group 106, a respective substack 105 of plies 102 comprises a sequence 107 of orientation angles 103 corresponding to the given group 106. For instance, as shown in FIG. 7, the first group 106 ("Group1") includes a substack 105 of plies 102 having the following sequence 107 of orientation angles 103: 0, −45, 90, −45, 0, 0, 45, 0. This sequence 107 can be seen with reference to both Charge1 and the third charge 104 ("Charge3"), which are both in Group1. Charge1 falls within the sequence 107 corresponding to Group1, even though Charge1 has one fewer ply 102 than Charge3. Specifically, Charge1 does not include a ply 102 at the first orientation angle 103 in the sequence 107 (i.e., 0 degrees).

The computing device 200 may identify two or more sequences 107 of orientation angles 103 from among the plurality of stacked plies 102 of reinforcing material, and each group 106 of charges 104 will correspond to one of the sequences 107 of orientation angles 103. Thus, the other groups 106 shown in FIG. 7 in addition to Group1, namely Group3 and Group4, each include a corresponding sequence 107 that differs from the sequence 107 corresponding to Group1. Additional charges 104 grouped into Group3 and Group4 will have a respective substack 105 of plies 102 that includes the respective corresponding sequence 107 of orientation angles 103.

FIG. 7 shows the first thirty-one plies 102 of the plank stringer 100 grouped into four charges 104. The remaining plies 102 may be grouped in a similar way, such that the two hundred total plies 102 in the plank stringer 100 are grouped into twenty-eight charges 104, which are grouped into four groups 106.

Figure 8:
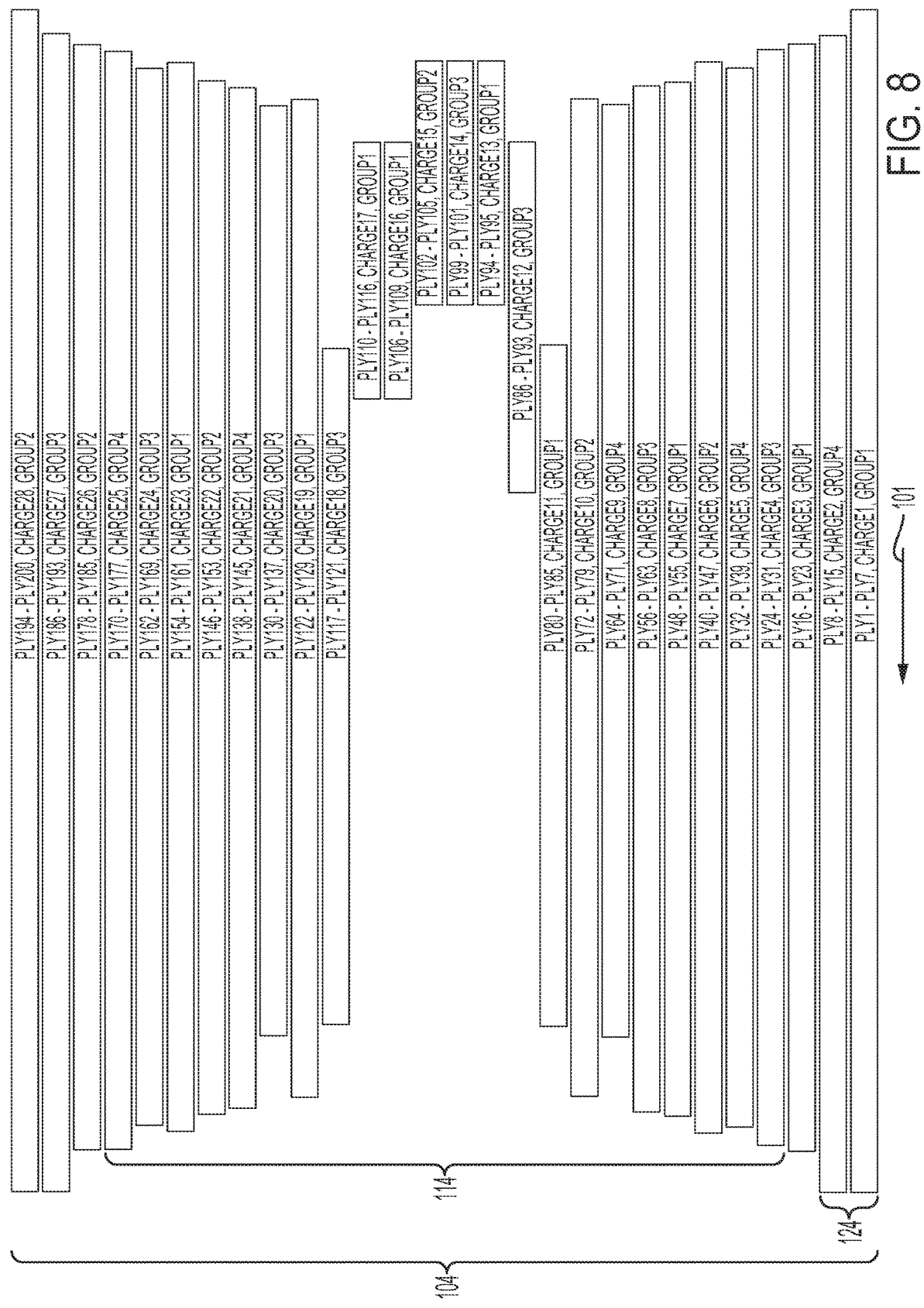
FIG. 8 illustrates a schematic view of a plurality of charges of a plank stringer, according to an example implementation.

For example, FIG. 8 shows a schematic side view of all twenty-eight charges 104 in the plank stringer 100, with notations indicating the plies 102 included in each substack 105 and the group 106 into which each charge 104 has been grouped. As can be seen in FIG. 8, the charges 104 differ in length and can include as few as two plies 102, such as Charge13.

The computing device 200 may analyze several variables that contribute to the fabrication process, such the speed of the ATLM 400 and the cutting tool 401, the precision with which the ATLM 400 can lay each ply 102, the precision with which the cutting tool 401 can trim each charge 104, the precision with which each charge 104 can be stacked on the previous charge 104, and the total number of steps involved in the layup, trimming, and handling of each charge 104. For example, the cutting tool 401 may have a lower tolerance compared to the tolerance with which two separately-trimmed charges 104 can be stacked one on top of the other. Thus, it may be desirable to group the plies 102 such that there is a relatively higher number of plies 102 per charge 104, which will correspondingly decrease the number of charges 104 and thus the number of lower-precision stacking actions in the fabrication process. This enables a more efficient manufacturing process with fewer steps.

However, with reference to FIG. 8, it can be seen that the grouping of plies 102 into the plurality of charges 104 may also have certain constraints based on the geometric variability of the plank stringer 100. For instance, the length of each charge 104 and the number of plies 102 in each charge may both account for the discontinuation of plies 102 at particular points along the longitudinal axis 101 of the plank stringer 100, as discussed above and shown by way of example in FIG. 4.

Further, grouping the plurality of stacked plies 102 of reinforcing material into the plurality of charges 104 may account for the variability in the angle of incline of the side walls of the plank stringer 100, as discussed above and shown by way of example in FIG. 2. For instance, the plurality of stacked plies 102 of reinforcing material may be grouped such that a first set 114 of charges 104 corresponds to the first section 111 and a second set 124 of charges 104 corresponds to the second section 121, as shown in FIG. 8.

Turning now to FIG. 9, a plan view of the first group 106 of charges 104 ("Group1") is shown, nested together and laid up as a continuous blanket 108 of plies 102. The continuous layup is made possible due to each charge 104 in Group1 including the same sequence 107 of orientation angles 103, as discussed above. For example, the computing device 200 may cause the fabrication system 300 to lay up each group 106 of charges 104 as a continuous blanket 108 of plies 102. For instance, the computing device 200 may send instructions to the ATLM 400 to lay up the plies 102 of reinforcing material of each continuous blanket 108, where each continuous blanket 108 of plies 102 comprises the respective substack 105 of plies 102 for each charge 104 in the respective group 106. The lines separating each charge 104 in FIG. 9 are provided to delineate the adjacent charges 104, and do not necessarily correspond to cutting lines, which can be seen in FIG. 10.

As shown in FIG. 9, laying up each group 106 of charges 104 as the continuous blanket 108 of plies 102 may include laying up a shortened section 117 of the continuous blanket 108. The shortened section 117 may include one or more charges 104 that include the one or more discontinued plies 116, as discussed above. Further, in addition to laying up charges 104 within a given group 106 side by side, FIG. 9 illustrates how one or more shorter charges 104 that includes discontinued plies 116 may be laid up in the continuous blanket 108 in an end to end fashion.

FIG. 10 shows a cross-sectional view of the continuous blanket 108 shown in FIG. 9. As with some of the other Figures, FIG. 10 is not to scale, and in particular is exaggerated in the vertical direction for ease of illustration. FIG. 10 shows how the computer device 200 may cause the fabrication system 300 to cut, via the automated cutting tool 401, each continuous blanket 108 of plies 102 into the respective group 106 of charges 104. For example, the cutting tool 401 may cut the continuous blanket 108 along the cutting lines 403 as shown in FIG. 10. Further, the angle and separation of the cutting lines 403 may vary depending on the eventual location of the charge 104 in the plank stringer 100. For instance, the cutting lines 403 for Charge1 reflect its location as the bottommost charge 104 in the plank stringer 100, as they are further apart and less steep than the cutting lines 403 for the other charges 104 in the continuous blanket 108.

In some implementations, a first charge 134 in a given group 106 of charges 104 includes a first substack 135 of plies 102 having fewer plies 102 than at least one other charge 104 in the given group 106. As discussed above with respect to FIG. 7, Charge1 has one fewer ply 102 than Charge3, and thus Charge1 may represent the first charge 134. Further, and as shown in FIG. 10, both of Charge11 and Charge13 have fewer plies than the other charges 104 in Group1. Accordingly, laying up the given group 106 of charges 104 as the continuous blanket 108 of plies 102 may include laying up a portion 118 of the continuous blanket 108 having a variable thickness 119 based on at least the first charge 134 having fewer plies 102 than at least one other charge 104 in the given group 106.

In a similar way, the fabrication system 300 may lay up a continuous blanket 108 for each of the other groups 106 of charges 104 of the example plank stringer 100, and then each continuous blanket 108 may be cut into their respective charges 104. The fabrication system 300 may then stack the plurality of charges 104 to form the plank stringer 100. For example, the fabrication system 300 may include an automated handling device, such as one or more robotic arms, configured to pick up each charge 104 and stack them into the plank stringer 100 before they are fully cured. Once the charges 104 are stacked, the plank stringer 100 may then be fully cured according to known curing methods.

Figure 11:
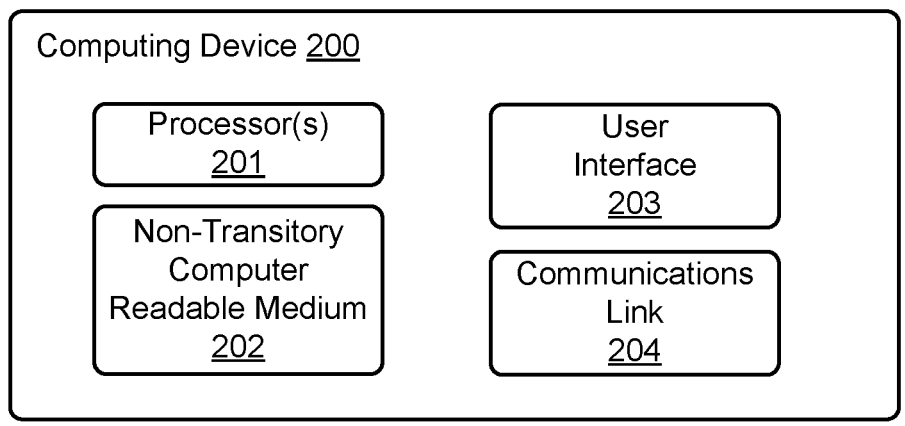
FIG. 11 illustrates a block diagram of an example computing device, according to an example implementation.

FIG. 11 illustrates a block diagram of an example computing device 200 that forms a part of the fabrication system 300. In some implementations, the computing device 200 may be an onboard computer housed on the ATLM 400, or it may be a remote computer that is communicatively coupled to the ATLM 400 via a communications link 204. For example, the computing device 200 may be communicatively coupled to the ATLM 400 via the wireless connection 402 shown in FIG. 4. Additionally or alternatively, the computing device 200 may communicate via a wired connection to the ATLM 400. Further, the computing device 200 shown in FIG. 11 might not be embodied by a single device, but may represent a combination of computing devices that may or may not be in the same location.

The computing device 200 may include a non-transitory, computer readable medium 202 that includes instructions that are executable by one or more processors 201. The non-transitory, computer readable medium 202 may include other data storage as well. For example, data representing a proposed design for a plank stringer 100 may be stored by the non-transitory, computer readable medium 202. The instructions may then cause the computing device 200 to analyze the proposed design and group the plies 102 and charges 104 as discussed above. The ply 102 and charge 104 groupings may be stored on the stored by the non-transitory, computer readable medium 202 and used by the computing device 200 to direct the ATLM 400 and cutting tool 401 as noted above.

In some implementations, the computing device 200 also includes a user interface 203 for receiving inputs from a user, and/or for outputting operational data to a user. The user interface 203 might take the form of a control panel located on the ATLM 400, or a graphical user interface at a remote location, connected to the ATLM 400 wirelessly or via a wired connection, among other examples. Other user interface possibilities also exist, and the computing device 200 may include further components that contribute to the operation of the fabrication system 300.

Figure 12:
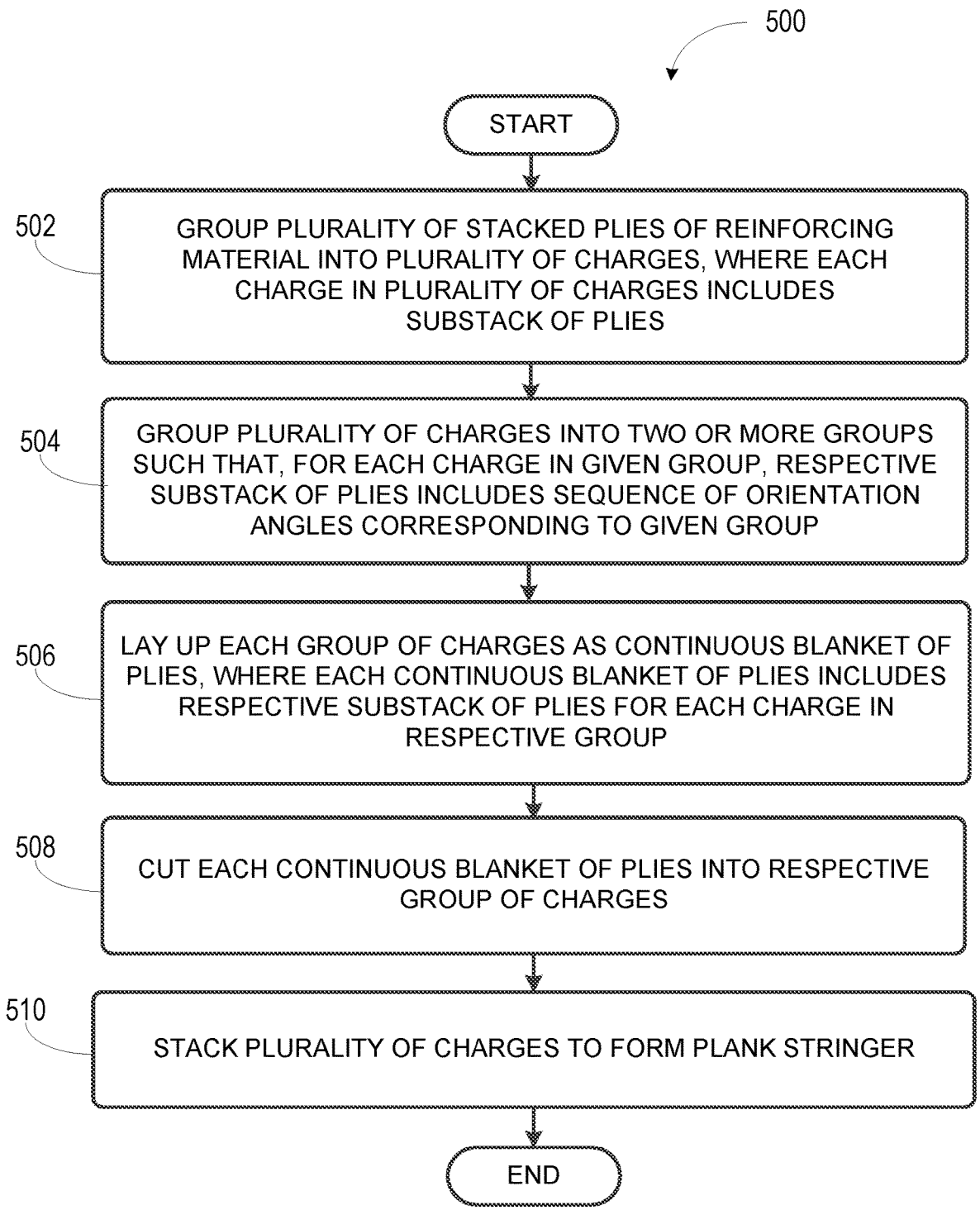
FIG. 12 shows a flowchart of an example method of fabricating a plank stringer, according to an example implementation.

Turning now to FIG. 12, a flowchart of a method 500 of fabricating a plank stringer for use in an aircraft is shown, according to an example implementation. Method 500 shown in FIG. 12 presents an example of a method that, for instance, could be used with the fabrication system 300 in the fabrication of the plank stringer 100, as shown in FIGS. 1-11 and discussed herein. It should be understood that for these and other processes and methods disclosed herein, flowcharts show functionality and operation of one possible implementation of present examples. In this regard, each block in a flowchart may represent a module, a segment, or a portion of program code, which includes one or more instructions executable by a processor for implementing or causing specific logical functions or steps in the process. For example, the method 500 may be implemented in whole or in part by one or more computing devices, such as the computing device 200 as shown in FIG. 11 and discussed herein. Alternative implementations are included within the scope of the examples of the present disclosure, in which functions may be executed out of order from that shown or discussed, including substantially concurrently, depending on the functionality involved, as would be understood by those reasonably skilled in the art.

At block 502, the method 500 includes grouping, via the computing device 200, the plurality of stacked plies 102 of reinforcing material into a plurality of charges 104, where each charge 104 in the plurality of charges 104 includes a substack 105 of plies 102. As discussed previously, the plies 102 in each charge 104 may be grouped based on their orientation angles with respect to the longitudinal axis 101 of the plank stringer 100, the resulting number of charges 104, and the profile of the plank stringer 100, in order to provide for the efficient fabrication of the plank stringer 100.

At block 504, the method 500 includes grouping, via the computing device 200, the plurality of charges 104 into two or more groups 106 such that, for each charge 104 in a given group 106, a respective substack 105 of plies 102 includes a predetermined sequence 107 of orientation angles 103 corresponding to the given group 106. An example grouping of plies 102 and charges 104 is discussed above and shown in FIGS. 7 and 8. As noted above, the charges 104 may be grouped into the groups 106 in such a way that allows for the greatest number of charges 104 to be laid up continuously in each group 106, thus requiring fewer groups 106. This may also reduce the number of steps required in fabricating the plank stringer 100.

Further, the method 500 may involve identifying two or more sequences 107 of orientation angles 103 from among the plurality of stacked plies 102 of reinforcing material. As noted above, each group 106 of charges 104 corresponds to one of the predetermined sequences 107 of orientation angles 103.

In some implementations, the plank stringer 100 may include at least a first section 111 having first side walls 112 at a first angle of incline 113 and a second section 121 having second side walls 122 at a second angle of incline 123, as shown in FIG. 2. Grouping the plurality of stacked plies 102 of reinforcing material into the plurality of charges 104 may include grouping the plurality of stacked plies 102 of reinforcing material such that a first set 114 of charges 104 corresponds to the first section 111 and a second set 124 of charges 104 corresponds to the second section 121, which can be seen in FIG. 8.

At block 506, the method 500 includes laying up each group 106 of charges 104 as a continuous blanket 108 of plies 102, where each continuous blanket 108 of plies 102 includes the respective substack 105 of plies 102 for each charge 104 in the respective group 106. As discussed above, such a continuous blanket 108 is shown in FIGS. 9 and 10, and may include variations based on the designed profile geometry of the plank stringer 100. For example, a height 115 of the plank stringer 100 may vary based on one or more discontinued plies 116 within the plurality of stacked plies 102 of reinforcing material, as shown in FIG. 4. Accordingly, laying up each group 106 of charges 104 as the continuous blanket 108 of plies 102 may include laying up a shortened section 117 of the continuous blanket 108, as shown in FIG. 9. The shortened section 117 of the continuous blanket 108 comprises one or more charges 104 including the one or more discontinued plies 116.

As another example, a first charge 134 in a given group 106 of charges 104 may include a first substack 135 of plies 102 having fewer plies 102 than at least one other charge 104 in the given group 106, as shown in FIG. 10. In this case, laying up the given group 106 of charges 104 as the continuous blanket 108 of plies 102 may include laying up a portion 118 of the continuous blanket 108 having a variable thickness 119 based on at least the first charge 134 having fewer plies 102 than at least one other charge 104 in the given group 106. Thus, laying up the charges 104 of a given group 106 as a continuous blanket 108 may allow for multiple different portions of the plank stringer 100 to be laid up at once. For example, FIGS. 8-10 show that several non-consecutive charges 104 may be laid up in a one continuous blanket 108, requiring fewer groups 106 that must be laid up in total, and thus fewer fabrication steps.

At block 508, the method 500 includes cutting each continuous blanket 108 of plies 102 into the respective group 106 of charges 104. For instance, each charge 104 may be cut from the continuous blanket 108 along cutting lines 403 that are angled according to the location of each charge 104 in the plank stringer 100, as shown in FIG. 10 and discussed above. As shown in FIG. 10, different cutting angles may be used for different charges 104 within a single continuous blanket 108, which allows for charges 104 having a different profile to be grouped together.

At block 510, the method 500 includes stacking the plurality of charges 104 to form the plank stringer 100. As can be seen from FIGS. 8-10, this can include stacking the charges 104 from several different groups 106 in an interleafed fashion, where charges 104 from one group 106 are stacked adjacent to charges 104 from one or more other groups 106. For example, the charges 104 may be stacked by an autonomous component of the fabrication system 300, as noted above. Further, the method 500 may include curing the stacked plurality of charges 104 to form the plank stringer 100.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A fabrication system for a plank stringer for use in an aircraft, wherein the plank stringer comprises a longitudinal axis and a plurality of stacked plies of reinforcing material, and wherein each ply of reinforcing material in the plurality of stacked plies of reinforcing material is arranged at an orientation angle with respect to the longitudinal axis, the fabrication system comprising:
   an automated tape-laying machine (ATLM);
   an automated cutting tool; and
   a computing device comprising:
      one or more processors; and
      a non-transitory, computer readable medium having stored thereon instructions, that when executed by the one or more processors, cause the computing device to perform functions comprising:
         grouping the plurality of stacked plies of reinforcing material into a plurality of charges, wherein each charge in the plurality of charges comprises a sub stack of plies;
         grouping the plurality of charges into two or more groups such that, for each charge in a given group, a respective substack of plies comprises a sequence of orientation angles corresponding to the given group, and wherein each group has a different sequence of orientation angles for the respective substack of plies and wherein a first charge in a given group of charges includes fewer plies than at least one other charge in the given group;
         laying up, via the ATLM, each group of charges as a continuous blanket of plies, wherein each continuous blanket of plies comprises the respective substack of plies for each charge in the respective group, wherein each group of charges is laid up as a separate continuous blanket of plies;
         cutting, via the automated cutting tool each continuous blanket of plies into the respective group of charges; and
         stacking the plurality of charges to form the plank stringer.

2. The fabrication system of claim 1, wherein the functions further comprise:
identifying two or more sequences of orientation angles from among the plurality of stacked plies of reinforcing material, wherein each group of charges corresponds to one of the sequences of orientation angles.

3. The fabrication system of claim 1, wherein the plank stringer comprises at least a first section having first side walls at a first angle of incline and a second section having second side walls at a second angle of incline, and wherein grouping the plurality of stacked plies of reinforcing material into the plurality of charges comprises grouping the plurality of stacked plies of reinforcing material such that a first set of charges corresponds to the first section and a second set of charges corresponds to the second section.

4. The fabrication system of claim 1, wherein a height of the plank stringer varies along the longitudinal axis based on one or more discontinued plies within the plurality of stacked plies of reinforcing material, and wherein laying up each group of charges as the continuous blanket of plies comprises laying up a shortened section of the continuous blanket, wherein the shortened section of the continuous blanket comprises one or more charges including the one or more discontinued plies.

5. The fabrication system of claim 1, wherein laying up the given group of charges as the continuous blanket of plies comprises laying up a portion of the continuous blanket having a variable thickness based on at least the first charge having fewer plies than at least one other charge in the given group.

6. The fabrication system of claim 1, wherein the automated cutting tool is integrated with the ATLM.

7. The fabrication system of claim 1, where cutting, via the automated cutting tool each continuous blanket of plies into the respective group of charges comprises:
using different cutting angles for different charges within the continuous blanket of plies to allow for the plurality of charges in the given group having a different profile and still grouped together in the continuous blanket due to have the same sequence of orientation angles of the respective substack of plies.

8. A method of fabricating a plank stringer for use in an aircraft, wherein the plank stringer comprises a longitudinal axis and a plurality of stacked plies of reinforcing material, and wherein each ply of reinforcing material in the plurality of stacked plies of reinforcing material is arranged at an orientation angle with respect to the longitudinal axis, the method comprising:
grouping, via a computing device, the plurality of stacked plies of reinforcing material into a plurality of charges, wherein each charge in the plurality of charges comprises a substack of plies;
grouping, via the computing device, the plurality of charges into two or more groups such that, for each charge in a given group, a respective substack of plies comprises a sequence of orientation angles corresponding to the given group, and wherein each group has a different sequence of orientation angles for the respective substack of plies and wherein a first charge in a given group of charges includes fewer plies than at least one other charge in the given group;
laying up each group of charges as a continuous blanket of plies, wherein each continuous blanket of plies comprises the respective substack of plies for each charge in the respective group, wherein each group of charges is laid up as a separate continuous blanket of plies;
cutting each continuous blanket of plies into the respective group of charges; and
stacking the plurality of charges to form the plank stringer.

9. The method of claim 8, further comprising:
identifying two or more sequences of orientation angles from among the plurality of stacked plies of reinforcing material, wherein each group of charges corresponds to one of the sequences of orientation angles.

10. The method of claim 8, wherein the plank stringer comprises at least a first section having first side walls at a first angle of incline and a second section having second side walls at a second angle of incline, and wherein grouping the plurality of stacked plies of reinforcing material into the plurality of charges comprises grouping the plurality of stacked plies of reinforcing material such that a first set of charges corresponds to the first section and a second set of charges corresponds to the second section.

11. The method of claim 8, wherein a height of the plank stringer varies along the longitudinal axis based on one or more discontinued plies within the plurality of stacked plies of reinforcing material, and wherein laying up each group of charges as the continuous blanket of plies comprises laying up a shortened section of the continuous blanket, wherein the shortened section of the continuous blanket comprises one or more charges including the one or more discontinued plies.

12. The method of claim 8, wherein laying up the given group of charges as the continuous blanket of plies comprises laying up a portion of the continuous blanket having a variable thickness based on at least the first charge having fewer plies than at least one other charge in the given group.

13. The method of claim 8, further comprising:
curing the stacked plurality of charges.

14. The method of claim 8, wherein cutting each continuous blanket of plies into the respective group of charges comprises using different cutting angles for different charges within the continuous blanket of plies to allow for the plurality of charges in the given group having a different profile and still grouped together in the continuous blanket due to have the same sequence of orientation angles of the respective substack of plies.

15. A non-transitory computer readable medium having stored thereon instructions executable by the computing device to perform functions for fabricating a plank stringer for use in an aircraft, wherein the plank stringer comprises a longitudinal axis and a plurality of stacked plies of reinforcing material, and wherein each ply of reinforcing material in the plurality of stacked plies of reinforcing material is arranged at an orientation angle with respect to the longitudinal axis, the functions comprising:
grouping the plurality of stacked plies of reinforcing material into a plurality of charges, wherein each charge in the plurality of charges comprises a substack of plies;
grouping the plurality of charges into two or more groups such that, for each charge in a given group, a respective substack of plies comprises a sequence of orientation angles corresponding to the given group, and wherein each group has a different sequence of orientation angles for the respective substack of plies and wherein a first charge in a given group of charges includes fewer plies than at least one other charge in the given group;
laying up each group of charges as a continuous blanket of plies, wherein each continuous blanket of plies comprises the respective substack of plies for each charge in the respective group, wherein each group of charges is laid up as a separate continuous blanket of plies;

cutting each continuous blanket of plies into the respective group of charges; and stacking the plurality of charges to form the plank stringer.

16. The non-transitory computer readable medium of claim 15, wherein the instructions further comprise:

identifying two or more sequences of orientation angles from among the plurality of stacked plies of reinforcing material, wherein each group of charges corresponds to one of the sequences of orientation angles.

17. The non-transitory computer readable medium of claim 15, wherein the plank stringer comprises at least a first section having first side walls at a first angle of incline and a second section having second side walls at a second angle of incline, and wherein grouping the plurality of stacked plies of reinforcing material into the plurality of charges comprises grouping the plurality of stacked plies of reinforcing material such that a first set of charges corresponds to the first section and a second set of charges corresponds to the second section.

18. The non-transitory computer readable medium of claim 15, wherein a height of the plank stringer varies along the longitudinal axis based on one or more discontinued plies within the plurality of stacked plies of reinforcing material, and wherein laying up each group of charges as the continuous blanket of plies comprises laying up a shortened section of the continuous blanket, wherein the shortened section of the continuous blanket comprises one or more charges including the one or more discontinued plies.

19. The non-transitory computer readable medium of claim 15, wherein laying up the given group of charges as the continuous blanket of plies comprises laying up a portion of the continuous blanket having a variable thickness based on at least the first charge having fewer plies than at least one other charge in the given group.

20. The non-transitory computer readable medium of claim 15, wherein cutting each continuous blanket of plies into the respective group of charges comprises:

using different cutting angles for different charges within the continuous blanket of plies to allow for the plurality of charges in the given group having a different profile and still grouped together in the continuous blanket due to have the same sequence of orientation angles of the respective substack of plies.

* * * * *